United States Patent

[11] 3,596,975

[72] Inventor James Stephen
 Royal Oak, Mich.
[21] Appl. No. 818,581
[22] Filed Apr. 23, 1969
[45] Patented Aug. 3, 1971
[73] Assignee Helm Design & Manufacturing, Inc.
 Detroit, Mich.

[54] WIND DEFLECTOR FOR AUTOMOBILES
 16 Claims, 8 Drawing Figs.

[52] U.S. Cl. ................................................ 296/1 S, 296/91
[51] Int. Cl. ............................................... B60j 1/20
[50] Field of Search .......................................... 296/1 (S), 91, 95; 160/39, 222, 368 (S); D14/6.7

[56] References Cited
UNITED STATES PATENTS

| | | | |
|---|---|---|---|
| 2,681,700 | 6/1954 | Krusemark ................ | 160/222 |
| 2,843,421 | 7/1958 | Shelton ...................... | 296/95 |
| 2,919,952 | 1/1960 | Riddle et al.................. | 296/91 |
| 3,059,562 | 10/1962 | Sturtevant et al............ | 296/91 X |
| 3,097,882 | 7/1963 | Andrews ..................... | 296/91 |
| 3,311,406 | 3/1967 | Fritsch ........................ | 296/91 |
| 3,429,357 | 2/1969 | Hood............................ | 296/95 X |

*Primary Examiner*—Benjamin Hersh
*Assistant Examiner*—Leslie J. Paperner
*Attorney*—Barnes, Kisselle, Raisch & Choate ABSTRACT: A wind deflector for automobiles comprising a central sheet metal portion having horizontally inwardly extending flanges along the top and bottom edges thereof and die cast end portions telescoped within said flanges. Brackets are fixed to said telescoped portions of said die cast element and are fastened to the automobile top. An additional bracket is fixed to a member telescoped within said central body portion intermediate the ends thereof and is also fixed to the automobile top.

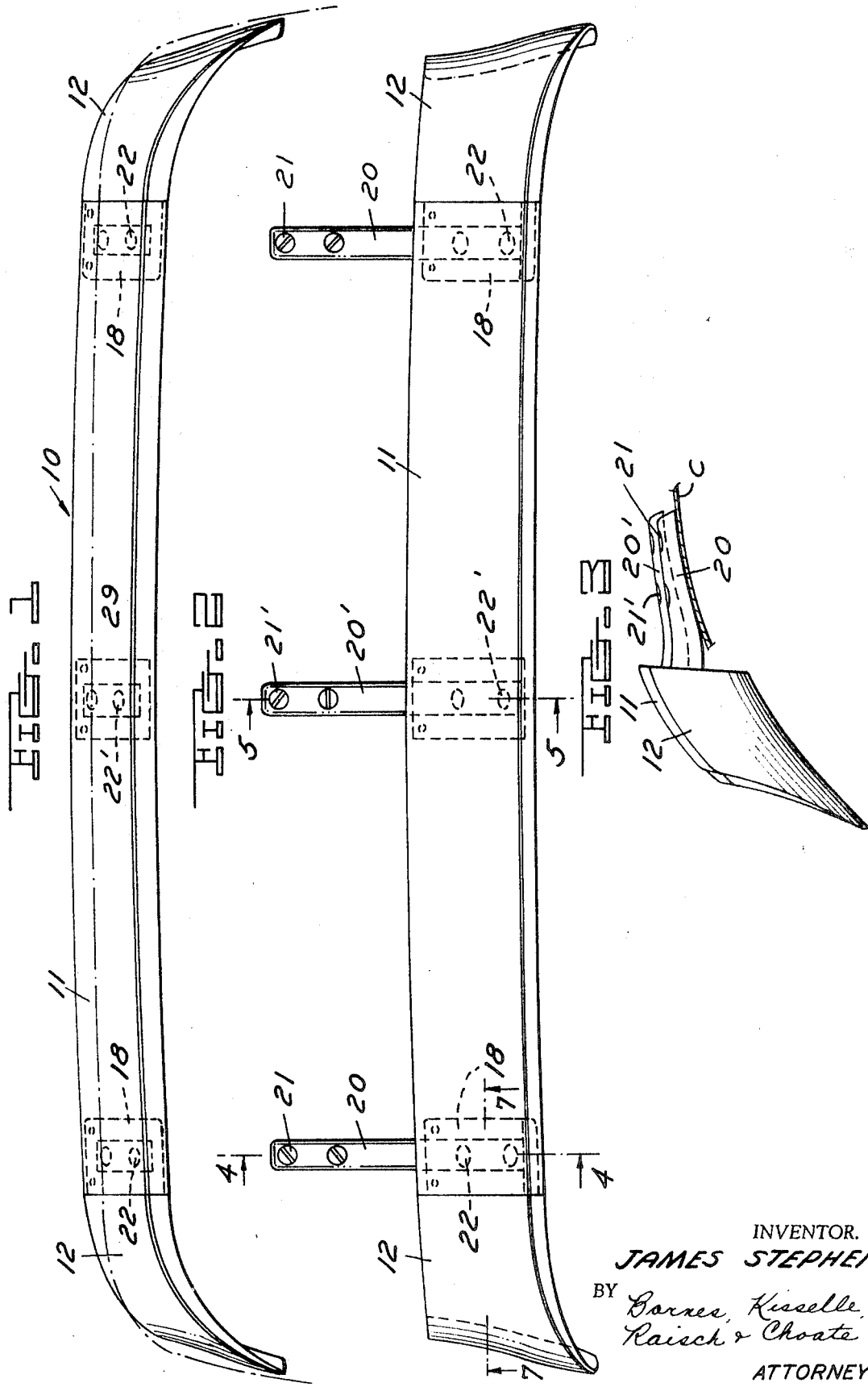

PATENTED AUG 3 1971
3,596,975
SHEET 2 OF 2
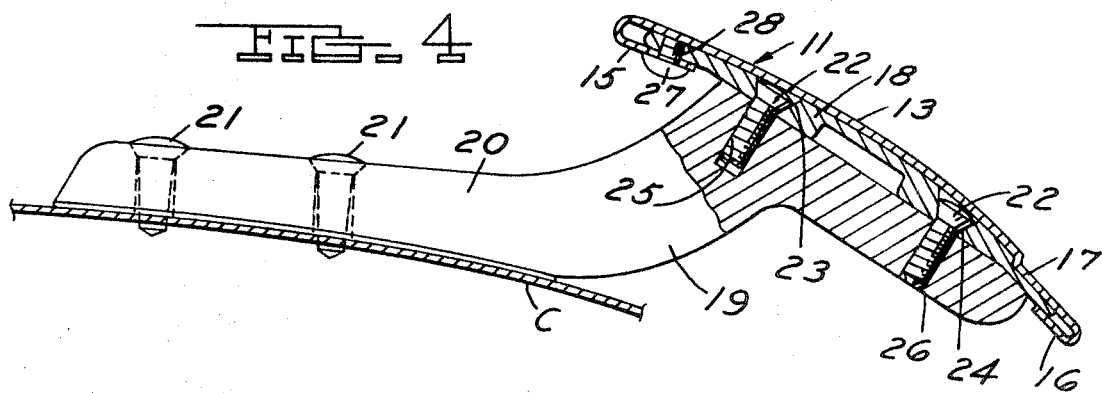
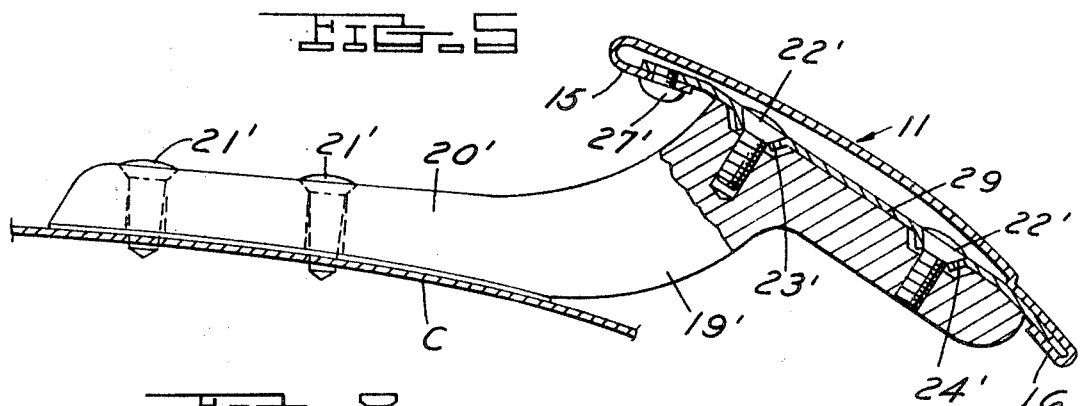
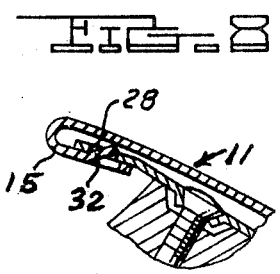
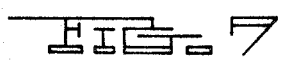
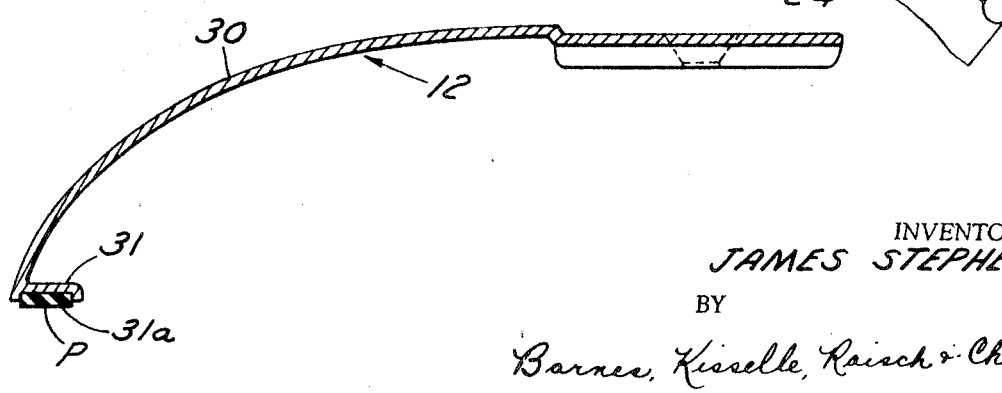
INVENTOR.
JAMES STEPHEN
BY
Barnes, Kisselle, Raisch & Choate
ATTORNEYS

WIND DEFLECTOR FOR AUTOMOBILES

This invention relates to wind deflectors for automobiles such as station wagons.

It is well known that in automobiles of the station wagon body type having a rear window, the flow of air tends to create a vacuum that causes dirt, snow and the like to accumulate on the rear window. In order to minimize this accumulation, it has heretofore been suggested that wind deflectors comprising a laterally extending member be provided adjacent the area of juncture of the automobile top and rear window for directing wind across the window.

Among the objects of the invention are to provide a relatively simple, efficient, low cost wind deflector; which is relatively attractive; and which can be readily assembled and mounted in position on the automobile.

In the drawings:

FIG. 1 is a rear elevational view of a wind deflector embodying the invention.

FIG. 2 is a plan view of the wind deflector.

FIG. 3 is a rear view of a portion of the deflector shown in FIGS. 1 and 2.

FIG. 4 is a fragmentary sectional view taken along the line 4—4 in FIG. 2.

FIG. 5 is a fragmentary sectional view taken along the line 5—5 in FIG. 2.

FIG. 6 is an end view of a portion of the deflector.

FIG. 7 is a sectional view of a portion of the deflector taken along the line 7—7 in FIG. 2.

FIG. 8 is a fragmentary sectional view similar to FIG. 5 of a modified form of the invention.

Referring to FIGS. 1 and 2, the deflector 10 embodying the invention is adapted to be mounted on the car top adjacent the area of juncture of the automobile top and the rear window and comprises a central body portion 11 and end portions 12 which are mirror images of one another.

The central body portion 11 is made of sheet metal and includes a substantially flat uniformly curved portion 13 (FIG. 4), an upper flange 15 turned inwardly and downwardly and extending substantially along the top edge, and a lower flange 16 turned inwardly and upwardly and extending substantially horizontally along the lower edge. The lower flange 16 has a smaller space between the walls thereof than the spacing of the upper flange 15 to produce a shoulder or depression 17 as shown in FIGS. 4 and 5.

Each end portion 12 is die cast and has a telescoping portion 18 of the configuration shown in FIG. 6 which telescopes into the ends of the central body portion 11 as shown in FIG. 4.

A bracket 19 which is preferably die cast includes an elongated portion 20 that extends along the automobile top C and is fixed thereto by screws 21. Screws 22 extend through openings 23, 24 in the portion 13 of end portion 12 and are threaded into openings 25, 26 in the bracket 19. A screw 27 is threaded upwardly through the flange 15 into an opening 28 along the upper edge of the telescoping portion 18. In this manner, the wind deflector is mounted on the car top.

Where the automobile has substantial width, an additional bracket 19' is provided intermediate the ends of the central portion 11 and a sheet metal plate 29 is telescoped between the flanges 15, 16. Screws 21', 22' are threaded through openings 23', 24' into threaded openings in the bracket 19' to provide an intermediate support. A screw 27' is threaded through the flange 15 into an opening in the plate 29.

As shown in FIGS. 1, 2 and 7, each end portion 12 includes a curved portion 30 that extends downwardly and forwardly and terminates in a flange 31 into adjacent relationship with the body of the automobile. A strip of foam plastic material P having pressure sensitive adhesive on the opposite surfaces thereof is fixed to a channel 31a in flange 31 by the adhesive on one side and extends and adhesively engages the body of the automobile.

In the form of the invention shown in FIG. 8, the screws 27, 27' are eliminated and in their place tabs 32 are bent upwardly from the flange 15 into the openings 28.

It is contemplated that in each of the forms of the invention, the screws 22, 22' can be inserted from beneath the brackets 19, 19' after the body portions 11 have been mounted on the portions 18, 29 by providing suitable access openings for the screws 22, 22'.

I claim:

1. The combination comprising
   an automobile having a top and a rear window, and
   a wind deflector mounted adjacent the area of juncture of the top and rear windows for directing air downwardly across the window,
   said wind deflector comprising a central body portion having generally horizontally extending inwardly turned flanges,
   end portions telescoped into said flanges,
   means for securing said end portions on said central body portion, and
   means for supporting said wind deflector on said automobile,
   said last-mentioned means comprising spaced brackets fixed to said automobile,
   means for mounting said deflector on said brackets,
   a member telescoped between said flanges,
   a bracket fixed to said automobile, and
   fastener means extending between said bracket and said member.

2. The combination comprising
   an automobile having a top and rear window, and
   a wind deflector mounted adjacent the area of juncture of the top and rear windows for directing air downwardly across the window,
   said wind deflector comprising a central body portion having generally horizontally extending inwardly turned flanges,
   end portions telescoped into said flanges,
   means for securing said end portions of said central body portion, and
   means for supporting said wind deflector on said automobile,
   said last-mentioned means comprising spaced brackets fixed to said automobile,
   means for mounting said deflector on sad brackets,
   a bracket fixed to said automobile, and
   fastener elements extending between said telescoped portion of said end portions and said bracket.

3. The combination comprising
   an automobile having a top and a rear window,
   and a wind deflector mounted adjacent the area of juncture of the top and rear windows for directing air downwardly across the window,
   said window deflector comprising a central body portion having generally horizontally extending inwardly turned flanges,
   end portions telescoped into said flanges,
   means for securing said end portions on said central body portion, and
   means for supporting said wind deflector on said automobile,
   said last-mentioned means comprising spaced brackets fixed to said automobiles,
   each said bracket having at least one opening therein,
   said deflector having portions thereof bent into said openings to mount said deflector on said brackets.

4. The combination comprising
   an automobile having a top and a rear window, and
   a wind deflector mounted adjacent the area of juncture of the top and rear windows for directing air downwardly across the window,
   said wind deflector comprising a central body portion having generally horizontally extending inwardly turned flanges, end portions telescoped into said flanges, means for securing said end portions on sad central body portion, and means for supporting said wind deflector on said automobile, said last-mentioned means comprising spaced brackets fixed to said automobile, means for mounting said deflector on said brackets, fastener elements extending through said end portions and into said brackets.

5. The combination set forth in claim 4 wherein said central body portion is made of sheet metal and said end portions are die cast.

6. The combination set forth in claim 4 wherein each said end portion includes a free edge extending into close proximity to said automobile.

7. The combination set forth in claim 6 including a resilient strip fixed to said edges and substantially engaging said automobile.

8. The combination set forth in claim 7 wherein said strip has pressure sensitive adhesive on the surface thereof adjacent said automobile.

9. For use with an automobile having a top and a rear window, a wind deflector adapted to be mounted adjacent the area of juncture of the top and rear windows for directing air downwardly across the window, said wind deflector comprising a central body portion having generally horizontally extending inwardly turned flanges, end portions telescoped into said flanges, means for securing said end portions on said central body portion, and means for supporting said wind deflector on said automobile, said last-mentioned means comprising spaced brackets adapted to be fixed to said automobile, means for mounting said deflector on said brackets, a member telescoped between said flanges, a bracket adapted to be fixed to sad automobiles, and fastener means extending between said bracket and said member.

10. For use with an automobile having a top and a rear window, a wind deflector adapted to be mounted adjacent the area of juncture of the top and rear windows for directing air downwardly across the window, said wind deflector comprising a central body portion having generally horizontally extending inwardly turned flanges, end portions telescoped into said flanges, means for securing said end portions on said central body portion, and means for supporting said wind deflector on said automobile, said last-mentioned means comprising spaced brackets adapted to be fixed to said automobile, means for mounting said deflector on said brackets, a bracket adapted to be fixed to said automobile, fastener elements extending between said telescoped portion of said end portions and said bracket.

11. For use with an automobile having a top and a rear window, a wind deflector adapted to be mounted adjacent the area of juncture of the top and rear windows for directing air downwardly across the window, said wind deflector comprising a central body portion having generally horizontally extending inwardly turned flanges, end portions telescoped into said flanges, means for securing said end portions on said central body portions, and means for supporting said wind deflector on said automobile, said last-mentioned means comprising spaced brackets fixed to said automobiles, each said bracket having at least one opening therein, said deflector having portions thereof bent into said openings to mount said deflector on said brackets.

12. For use with an automobile having a top and a rear window, a wind deflector adapted to be mounted adjacent the area of juncture of the top and rear windows for directing air downwardly across the window, said wind deflector comprising a central body portion having generally horizontally extending inwardly turned flanges, end portions telescoped into said flanges, means for securing said end portions on said central body portion, and means for supporting said wind deflector on said automobile, said last-mentioned means comprising spaced brackets adapted to be fixed to said automobile, means for mounting said deflector on said brackets, fastener elements extending through said end portions and into said brackets.

13. The combination set forth in claim 12 wherein each said end portion includes a free edge extending into close proximity to said automobile.

14. The combination set forth in claim 13 wherein said central body portion is made of sheet metal and said end portions are die cast.

15. The combination set forth in claim 13 including a resilient strip fixed to said edges and substantially engaging said automobile.

16. The combination set forth in claim 15 wherein said strip has pressure sensitive adhesive on the surface thereof adjacent said automobile.